United States Patent
Edwards (10) Patent No.: US 6,720,879 B2
(45) Date of Patent: Apr. 13, 2004

(54) ANIMAL COLLAR INCLUDING TRACKING AND LOCATION DEVICE

(75) Inventor: Marlena Edwards, Washington, DC (US)

(73) Assignee: Time-N-Space Technology, Inc., Laurel, MD (US)

(*) Notice: Subject to any disclaimer, the term of this patent is extended or adjusted under 35 U.S.C. 154(b) by 0 days.

(21) Appl. No.: 09/920,838

(22) Filed: Aug. 3, 2001

(65) Prior Publication Data

US 2002/0021219 A1 Feb. 21, 2002

Related U.S. Application Data (60) Provisional application No. 60/223,692, filed on Aug. 8, 2000.

(51) Int. Cl.$^7$ .............................................. G08B 23/00
(52) U.S. Cl. ................................ 340/573.3; 340/573.1; 340/573.4; 340/586; 340/825.49; 340/825.72; 340/815.68
(58) Field of Search .................... 340/573.3, 573.1, 340/573.4, 586, 825.49, 825.72, 815.68, 825.69

(56) References Cited

U.S. PATENT DOCUMENTS

| | | | |
|---|---|---|---|
| 4,413,588 A | | 11/1983 | Lindholm |
| 4,765,276 A | * | 8/1988 | Kime ..................... 340/825.69 |
| 5,122,939 A | | 6/1992 | Kazdan et al. |
| 5,370,082 A | | 12/1994 | Wade |
| 5,535,106 A | | 7/1996 | Tangen |
| 5,603,094 A | | 2/1997 | Greear, Jr. |
| 5,731,785 A | * | 3/1998 | Lemelson et al. ..... 340/825.49 |
| 5,816,198 A | | 10/1998 | Peterson |
| 5,850,196 A | | 12/1998 | Mowers |
| 5,857,433 A | | 1/1999 | Files |
| 5,868,100 A | * | 2/1999 | Marsh ..................... 340/573.1 |
| 5,879,076 A | | 3/1999 | Cross |
| 5,949,350 A | | 9/1999 | Girard et al. |
| 5,961,571 A | | 10/1999 | Gorr et al. |
| 6,014,080 A | | 1/2000 | Layson, Jr. |
| 6,016,119 A | * | 1/2000 | Krasner ...................... 701/213 |
| 6,067,018 A | * | 5/2000 | Skelton et al. ........... 340/573.3 |
| 6,114,957 A | | 9/2000 | Westrick et al. |
| 6,172,640 B1 | * | 1/2001 | Durst et al. .............. 340/573.3 |
| 6,181,373 B1 | * | 1/2001 | Coles .......................... 348/158 |
| 6,236,358 B1 | * | 5/2001 | Durst et al. ............ 342/357.09 |
| 6,263,836 B1 | * | 7/2001 | Hollis ..................... 340/573.1 |
| 6,271,757 B1 | * | 8/2001 | Touchton et al. ........ 340/573.1 |
| 6,292,213 B1 | * | 9/2001 | Jones ......................... 455/575 |
| 6,310,553 B1 | * | 10/2001 | Dance ..................... 340/573.3 |
| 6,366,311 B1 | * | 4/2002 | Monroe ...................... 342/439 |
| 6,421,001 B1 | * | 7/2002 | Durst et al. .............. 340/573.3 |
| 6,437,727 B2 | * | 8/2002 | Lemelson et al. ..... 342/357.17 |
| 6,449,010 B1 | * | 9/2002 | Tucker ....................... 348/157 |

OTHER PUBLICATIONS

Barias, Stephen, "Scraping Up Spectrum for Internet–Enabled Cell Telephony," IEEE Spectrum, Jun. 2001, pp. 34, 37.

"Camera Now In Chip Size," Jun. 2001, pp. 84–85, IEEE Spectrum.

(List continued on next page.)

*Primary Examiner*—Jeffrey Hofsass
*Assistant Examiner*—Daniel Previl
(74) *Attorney, Agent, or Firm*—Cahn & Samuels, LLP (57) ABSTRACT

This invention relates to an animal collar for locating and tracking animals. The animal collar is provided with a digital video camera that may be remotely controlled transmit real time full motion video signals over a broadband wireless communication network to allow a pet owner to view the immediate surroundings of a lost pet. The animal collar is further provided with a global positioning (GPS) unit that communicates with GPS satellites to determine the geographic coordinates of the animal collar.

22 Claims, 9 Drawing Sheets

OTHER PUBLICATIONS

Courier–Journal, "Wireless Wrist Location System," printed from Http://cgi.louisvillescene.com/cgi–bin/techwrapper, downloaded Apr. 7, 2001.

IROBOT Corp, "IRobot: NextBest Thing To Being There," Laptop, Jun. 2001, p. 133.

Out–A–Sight, "An Out–A–Sight Solution To Your Pet's Safety," printed from www.petloverscompanion.com.

Saha et al., "Brining the Wireless Internet to Mobile Devices," Computer, Jun. 2001, pp. 54–58, IEEE.

Sarnoff, Inc., "BLINC™ Miniature Smart Digital Camera Now," printed form www.sarnoff.com/sarnoff_story/press/2001/041701B.htm downloaded Jul. 29, 2001, and dated Apr. 17, 2001.

Wherify Wireless, Inc., "Wherify Wireless and SIRFTeam to Deliver Child Locator System," printed from www.wherigywireless.com/new/pressrelease/3.19.2001.htm downloaded Apr. 7, 2001.

Witulski, Meredith, "Interactive 360–degree Photo Technologies," How The Internet Works, pp. 190–195, Miscellanea.

* cited by examiner

ANIMAL COLLAR INCLUDING TRACKING AND LOCATION DEVICE

This application claims priority from U.S. provisional Application Ser. No. 60/223,692, filed Aug. 8, 2000.

TECHNICAL FIELD

This invention relates to systems for determining the location and tracking the movement of animals. More particularly, this invention relates to an animal collar that transmits location and tracking information to a remote receiving device.

BACKGROUND ART

Tracking the location of animals such as domesticated animals, pets or wild animals that can move in unknown directions over a considerable range of territory has been a concern for a number of years. Although many pet species have keen senses of direction, it is not uncommon for pets to wander from their homes and become lost. Many pet owners have no reliable mechanism for locating their pets when they are lost.

Zoologists, filmmakers and others often study animal behavior in the wild. Heretofore it has been difficult to experience that which a wild animal sees and hears in its native environment, undisturbed by human presence.

Active pet collars have been developed to help notify passersby that a pet is lost. For example, some pet collars allow the pet owner to remotely activate a visual display located on the collar, such as an inflatable balloon inscribed with the message "LOST PET," flashing lights, or an electronic display. Although these systems may alert bystanders in the immediate vicinity that the pet is lost, they do not help the owner determine the pet's location. As a result, unless a bystander contacts the pet owner, the pet will likely be lost for an extended period.

A number of systems have been proposed which employ existing wireless communication capabilities but which tend to be cumbersome, bulky, expensive or all of the above. Through the use of global positioning satellite system (GPS) services, it is possible to provide relatively inexpensive location systems for determining the location of moving objects. GPS technology has typically been utilized in connection with vehicles to provide location information for companies that have large fleets of trucks in use at any one particular time. The position of an individual truck is determined by the coincident reception of signals from at least three of the GPS satellites by a satellite receiver, which position can then be stored or can be transmitted to a central receiving station via some sort of wireless link.

Recently, GPS technology has been incorporated in pet location systems. For example, U.S. Pat. Nos. 6,067,018, 6,172,640 and 6,236,358 each disclose systems having pet collars that employ global positioning devices that generate data to facilitate calculation of a pet's specific location. Such technology, however, conveys little information about the immediate environment. Often, it would be helpful for the pet owner to observe the pet's surroundings and conditions, not just the representation of the pet's location on a map. This is particularly true for pet owners who rely heavily on landmarks for their sense of direction. None of the devices described in the above-referenced patents facilitate pet location by allowing the pet owner to view the pet's immediate surroundings.

Thus, there is a general need in the art for an animal location and tracking device that allows pet owners and other interested parties, to determine the location of their pets and to view their pets' immediate surroundings.

SUMMARY OF THE INVENTION

This invention is embodied by an apparatus for locating or tracking animals. The apparatus includes an animal collar including a digital video camera that generates video signals, a global positioning unit operative for receiving a global positioning signal and a controller in communication with the digital video camera and the global positioning unit. The controller includes a wireless communications link. A remote source is provided in communication with the wireless communication link where the controller is operative to transmit the video signals to said remote source.

The invention is also be embodied by an animal collar having a digital video camera that generates video signals, a global positioning unit operative for receiving a global positioning signal, and a controller in communication with the digital video camera and the global positioning unit. The controller is provided with a wireless communications link and is operative to transmit the video signals and the global positioning signals to a remote source responsive to a command from the remote source.

Given the following enabling description of the drawings, the apparatus should become evident to a person of ordinary skill in the art.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE DRAWINGS

The present invention may be embodied by an animal collar for tracking and locating animals. The animal collar includes a digital video camera that may be remotely activated and controlled to generate real time full motion video signals or selected time lapse signals, a global positioning (GPS) unit for determining the location coordinates of the animal collar and a controller including a broadband wireless communication link that facilitates communication between a remote source and the animal collar and, where applicable, which permits remote control of the digital camera and global positioning unit. The digital video camera, the GPS unit and the controller are preferably disposed on a device platform, e.g., a circuit board or other substrate.

As used in the specification, the broadband wireless communication link refers to any device that enables direct wireless communication with the components on the device platform. For example, the broad band wireless communication link may be a Code-Division Multiple Access (CDMA) device that provides broadband access to the Internet. Alternatively, the broadband wireless communication link could be a device that facilitates direct satellite communication from the animal collar to the remote receiver, As used herein, the term remote receiver refers to a device capable of receiving and displaying video and text data. Exemplary suitable remote receivers include PCs, hand-held consumer electronic devices such as PDAs, and PALs, standard consumer electronic devices such as smart watches and cell phones. The remote receiver may be resident at the pet owner's home or office. Alternatively, the remote receiver may be a hand-held device that the pet owner can carry as he searches for his pet.

As used herein, the term remote computing device includes servers, workstations, PCs, PDAs, PALs, programmed processors, and any other device capable of receiving and displaying video images and triangulating coordinates from location signals.

The digital video camera is preferably coupled to the controller. In one embodiment of the invention, the digital camera may be remotely activated by a command signal sent from the remote computing device or the remote receiver to the controller, which in turn sends the command signal to the digital video camera. Once activated, if movable rather than stationary, movement of the digital camera may be controlled remotely to allow the remote operator to view the animal's surroundings including the presence of any threat to its safety, the presence of intruders and even generally observable events (e.g, proximity to a crime, etc.). For example, the pan angle and the tilt angle of the camera may be adjusted either in real time or according to a predetermined pattern or duty cycle. This feature is particularly advantageous for assisting researchers and/or zoologists in studying the natural habitat of wild animals, for assisting rescue personnel in locating injury victims and for assisting security personnel in tracking criminals.

The global positioning unit is preferably coupled to and in communication with the controller. The global positioning unit may default to a sleep state or it may be default to the activation state. When the global positioning unit is in the sleep state, an operator may activate the global positioning unit by sending a command signal from the remote computing device or remote receiver to the controller, which in turn sends an activation signal to the global positioning unit. Once activated, the global positioning unit receives location signals from global positioning transmitters, typically satellites. The global positioning unit transmits the location signals to the controller, which triangulates this information to determine the coordinates where the animal collar is located. The broadband wireless communication link periodically transmits the coordinates and, in some embodiments, a unique pet identifier to the remote computing device or the remote receiver.

Alternatively, the controller may simply retransmit the signals received from the global positioning transmitters via the wireless communication link, and the remote computing device may perform the triangulation necessary to determine the coordinates for the animal collar location. To reduce power consumption by the animal collar preferably, both the global positioning unit and the digital video camera are not activated but are maintained in a sleep state until one of the remote computing device or the remote receiver transmits appropriate command signals to the controller. When the GPS unit and the digital video camera are in the wake state, the remote computing device and/or the remote receiver can also turn off the GPS unit and the digital video camera by transmitting subsequent command signals to the animal collar.

The remote computing device is preferably stored in a central facility that is capable of tracking the position of a large number of animals. In accordance with the invention, the remote computing device may periodically notify a pet owner or animal tracker of a subject animal's location by for example, transmitting a notification signal or e-mail message directly to the remote receiver or by posting information about the subject animal on a web server. In addition, a live operator may provide assistance over the telephone or via a computer or other communication device to help the pet owner/animal tracker in tracking the animal. The remote receiver may be located in the pet owner or animal tracker's home or it may be a hand-held device carried by the pet owner or animal tracker which allows the pet owner to perform tracking and view the animal's habitat without intervention from a third party.

In accordance with an aspect of the invention, the animal collar may include a digital recorder for storing audio and or video information in a format and at periodic intervals selected by the owner. The recorder may also contain a prerecorded voice message such as an audible warning activated remotely by security personnel or rescue status information activated remotely by rescue personnel. A local message may also be recorded including contact information, e.g., the pet owner's name, address and phone number. A passerby who finds the pet may play the recorded message and contact the pet owner. The digital recorder is preferably disposed on the device platform and may be activated and deactivated in a manner similar to the GPS unit and the digital video camera.

In accordance with another aspect of the invention, the animal collar may be provided with a miniature telephony device. The telephony device may be activated by depressing a button on the animal collar. Once activated, the device places a call to a preprogrammed number, preferably the pet owner or the central facility. A passerby may then explain the location of the pet to the pet owner or central facility operator and exchange any other information deemed pertinent. The telephony device is preferably disposed on the device platform and may be activated and deactivated in a manner similar to the GPS unit and the digital video camera.

The animal collar of the present invention preferably comprises two layers of material, a base layer and a cover layer. The base layer is preferably a durable, weather resistant material such as leather. The cover layer overlays the base layer and is preferably comprised of a thin plastic material, that in the case of a domesticated pet, includes a light emitting or phosphorescent substance that causes the animal collar to glow in the dark. To improve visibility of the animal collar at dusk and daybreak, a reflective material may be disposed along the edges of the cover layer.

The device platform and the wireless communication link are preferably sandwiched between the base and cover layers and the digital video camera and the button for the telephony device preferably protrude through the cover layer. Accordingly, the animal collar of the present invention constitutes a durable, unitary structure.

Figure 1:
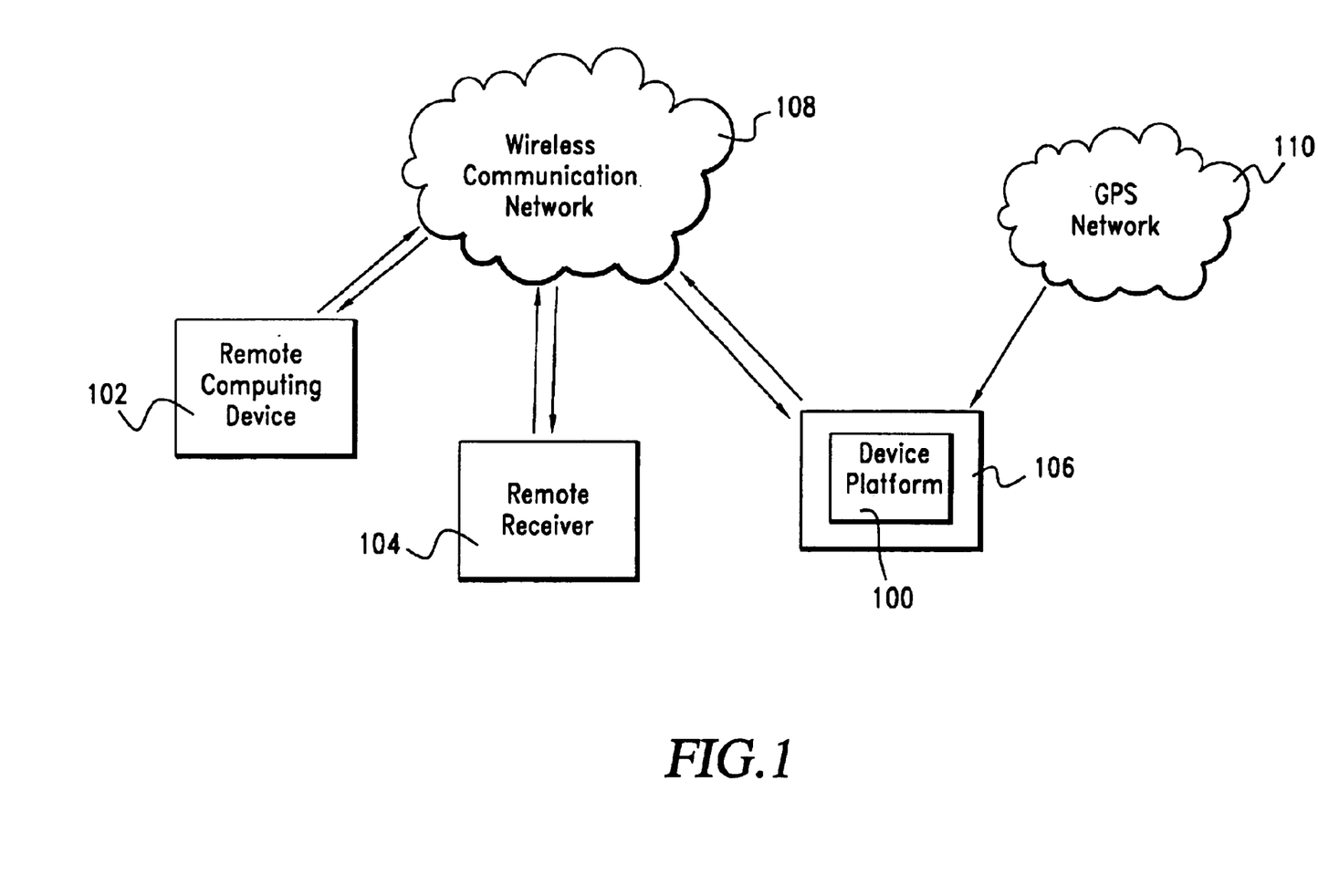
FIG. 1 is a system overview illustrating a system for locating and tracking animals in accordance with an embodiment of the invention.

Referring now to FIG. 1, there is illustrated a system for tracking and locating animals in accordance with the present invention. The system components include a device platform 100, a remote computing device 102 a remote receiver 104. Device platform 100 is preferably integrally formed with or coupled to an animal collar 106. Remote computing device 102 and remote receiver 104 and device platform 100 are in wireless communication with each other. In preferred embodiments, each of the remote computing device, the remote receiver and the device platform are connected to a wireless communication network 108, e.g., the Internet. Device platform 100 is also in communication with a global positioning satellite system 110 from which device platform 100 receives location signals.

Figure 2:
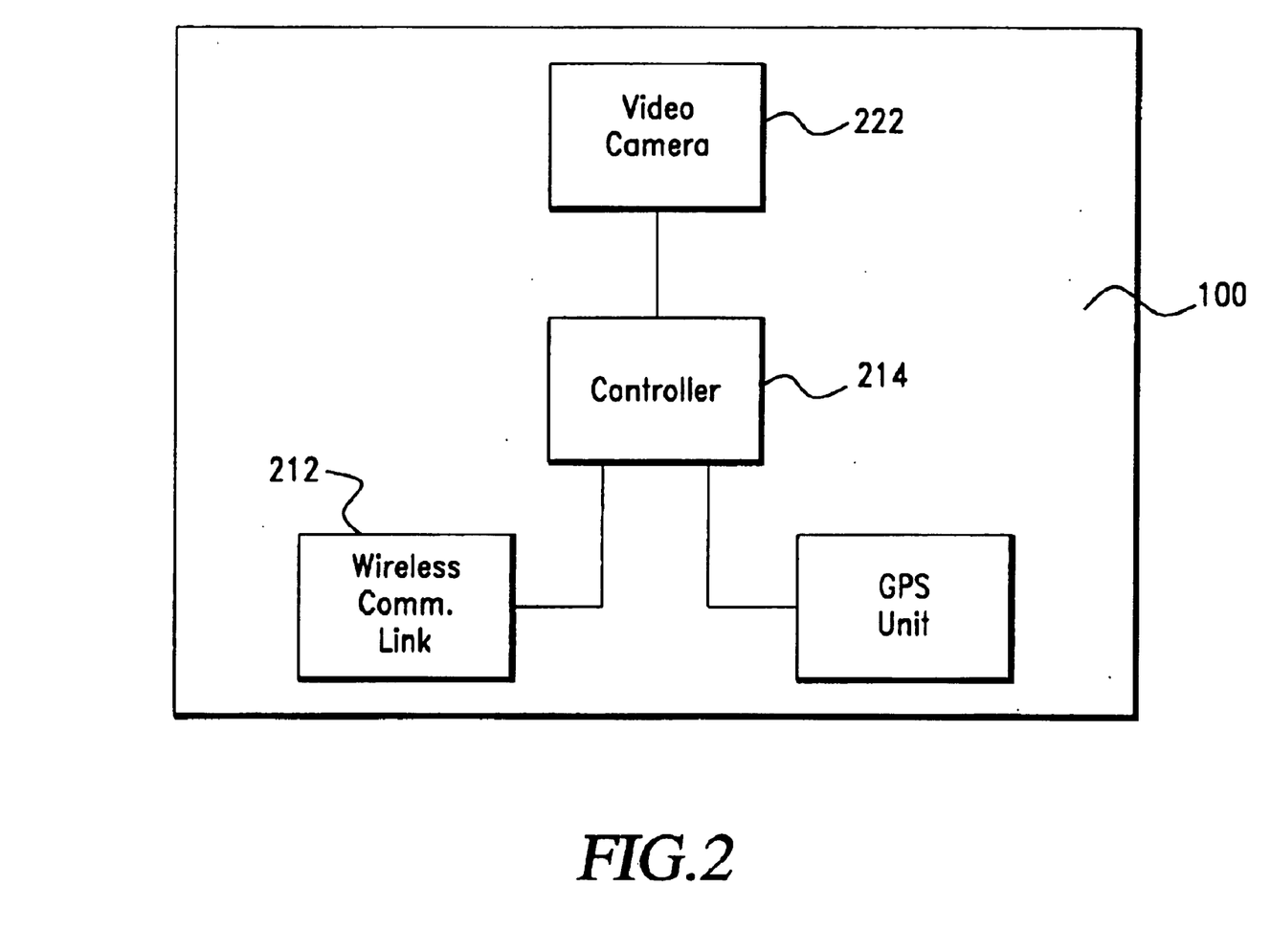
FIG. 2 is a block diagram of a device platform according to an embodiment of the present invention.
Figure 2A:
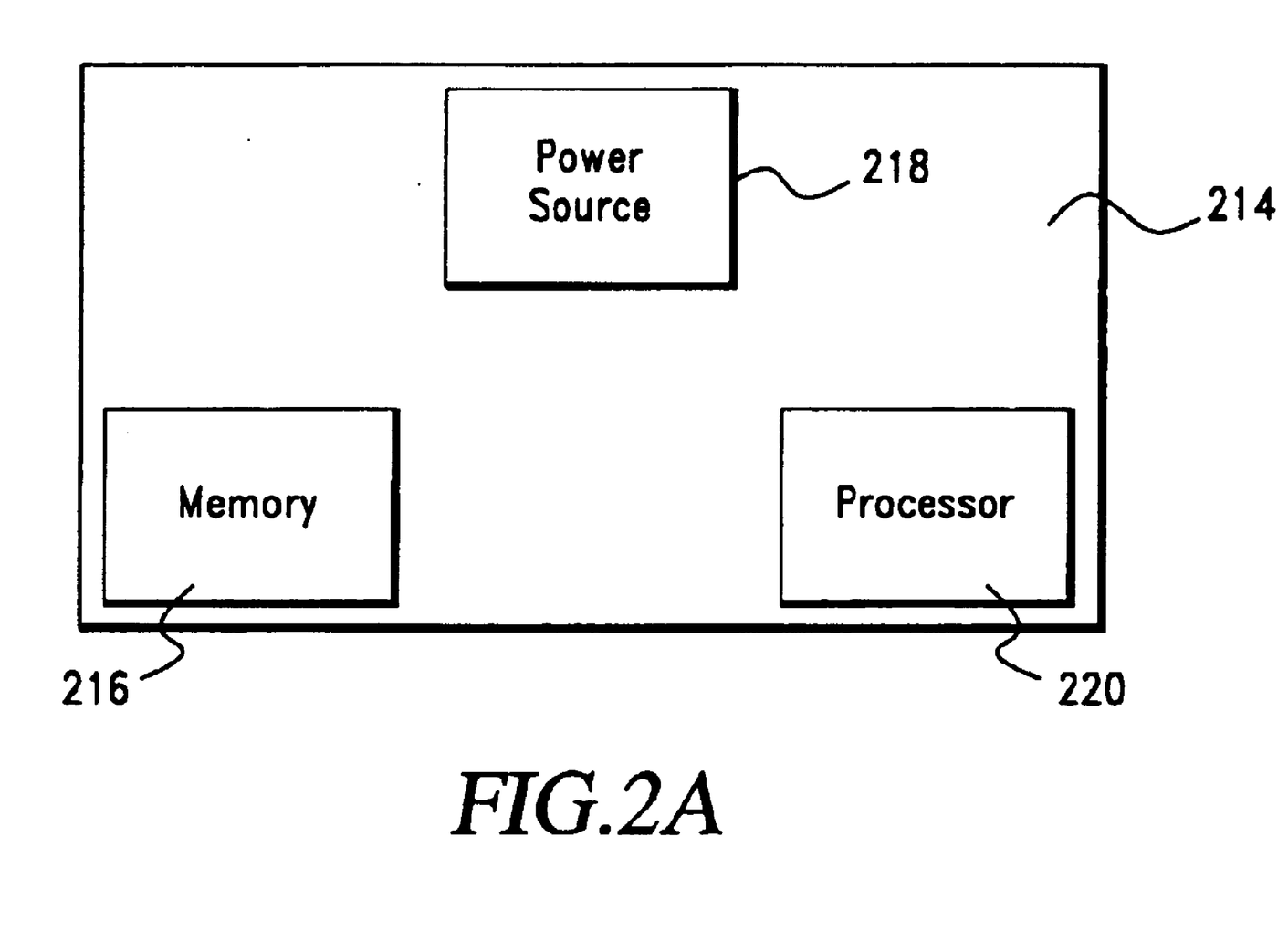
FIG. 2a is a block diagram of a controller according to the present invention.

FIG. 2 is a functional block diagram depicting the device platform 100 of an embodiment of the present invention. Device platform 100 includes the functional components that embody the location, tracking and other desired features of animal collar 106. A Controller 214 is coupled to device platform 100. As illustrated in FIG. 2a, controller 214 includes a memory 216 for storing location data and a power source 218 for supplying power to the components of device platform 100. Power source 218 is preferably a battery. More preferably, power source 218 is a rechargeable battery such as a NiCad battery or a Lithium ion battery. Controller 214 further includes a processor 220 that preferably comprises a single chip microprocessor or microcontroller or digital signal processor that may be programmed to provide a variety of functions and operational features. Such programs may be stored in memory 216 for use by the controller 214 in controlling the operation of the functional components of device platform 100.

Device platform 100 is provided with a broadband wireless communication link 212 that enables wireless communication between controller 214, remote computing device 102 and remote receiver 104.

In keeping with the invention, to allow an animal tracker or pet owner to view the environment or habitat to which animal collar 106 is exposed, a digital video camera 222 may be provided on device platform 100 and coupled to controller 214. The skilled artisan will realize that operation of digital video camera 222 may be controlled from one of remote computing device 102 and remote receiver 104. However, for ease of explanation, operation of digital video camera 222 will be explained in connection with the remote computing device 102.

To minimize power consumption, digital camera 222 may be maintained in a deactivated state or may be subject to duty cycling to provide images of selected periodicity for general environmental monitoring. In the case of security use, it is preferred that the images be continuous or nearly so. Therefore, it is preferred that power source 218 be rechargeable and/or supplemented by a solar cell.

When it is desired to view an animal's surroundings, remote computing device 102 may send a command signal to controller 214 via wireless communication link 212. Controller 214 receives the command signal and transmits an activation signal to digital camera 222. Upon activation, digital camera 222 preferably transmits real time full motion video signals to controller 214. Alternatively, digital camera 222 may transmit still motion video signals to controller 214 at intervals selected by a user. A preferred digital camera is available from the Sarnoff Corporation of Princeton, N.J. under the trademark BLINC™. Controller 214 preferably converts the video signal to a format suitable for relatively low power consumption transmission over wireless communication network 108 and transmits the video signals to wireless communication link 212, which, in turn transmits the converted signal to remote computing device 102. Using a similar procedure, digital video camera 222 may be deactivated responsive to a command signal.

A further advantageous feature of the invention digital camera 222 may be movably mounted to animal collar 106. That is, the camera is rotatable and the rotation may be controlled by either remote computing device 102 or receiving device 104. Upon receipt of a command signal from controller 214 the pan angle and the tilt angle of digital camera 222 may be adjusted either in real time or according to a predetermined pattern, For example, digital camera 222 may be driven through a pan angle of up to 360° and a tilt angle of up to 180°. An operator may adjust the angle of digital camera 222 using a pointing device associated with the remote computing device 102, such as a mouse, in real time using software such as that employed in the iRobot-LE multipurpose robot available from Robot Corporation of Somerville, Mass.

Alternatively, a rotation pattern for digital camera 222 may be stored in memory 216. When remote computing device 102 transmits a command signal to controller 214 via communication link 212, controller 214 transmits a command signal to digital camera 222 directing digital camera 222 to rotate in accordance with the stored rotation pattern. An exemplary rotation pattern may comprise panning the digital camera in 15, 20 or 30-second time increments and tilting the digital camera in 15, 20 or 30 second time increments. During the panning time increment, digital camera 222 may traverse a pan angle of up to 360°. Likewise, during its tilting increment, digital camera 222 may traverse a tilt angle of up to 180°.

To facilitate animal tracking, device platform 100 is provided with a tracking unit such as GPS unit 224. GPS unit 224 is preferably coupled to controller 214, which in turn is coupled with wireless communications link 212. GPS unit 224 preferably includes a GPS receiver (not shown) and a GPS antenna (not shown). Wireless link 212 allows the GPS unit to both receive and transmit signals over wireless communications network 108.

GPS unit 224 may be maintained in a sleep state and activated and deactivated by transmitting command signals to controller 214. For example, command signals are received by wireless communication link 212 and passed to controller 214, which generates an activation or deactivation signal for the GPS receiver. The GPS receiver continually receives location signals from GPS network 110 through the GPS antenna, and controller 214 uses this information to triangulate or otherwise determine the coordinates where the animal collar is located. These coordinates and, in preferred embodiments, a unique animal identifier may then be transmitted to wireless communications link 212, which may transmit the information to, for example, remote computing device 102. In accordance with known GPS technology, remote computing device 102 may generate a map on a display device using the coordinate information showing the animal's location. This will allow the tracking station operator to accurately locate the animal.

The pet owner may retrieve coordinate data directly from remote computing device 102. This may be done by connecting to remote computing device 102 using a conventional telephone and inputting the animal identifier. Remote computing device 102 will then retrieve the coordinate data corresponding to the animal identifier and provide it to the owner. Alternatively, the animal collar coordinates and/or additional coordinate information, such as a map, may be posted on an Internet web page. The pet owner may then log in to the web page from remote receiver 104, provide the animal identifier and view the location of the animal embodied in a map image displayed by remote receiver 104. To reduce power consumption of the animal collar, controller 214 may simply pass the GPS location signals to one of remote computing device 102 and remote receiver 104 where triangulation may be performed to determine the coordinates where the animal collar is located.

In some applications, it is desirable to simultaneously activate digital video camera 222 and GPS unit 224. Accordingly, controller 214 may be programmed to transmit an activation signal to both digital video camera 222 and GPS unit 224 responsive to a single command signal from remote computing device 102.

Figure 3:
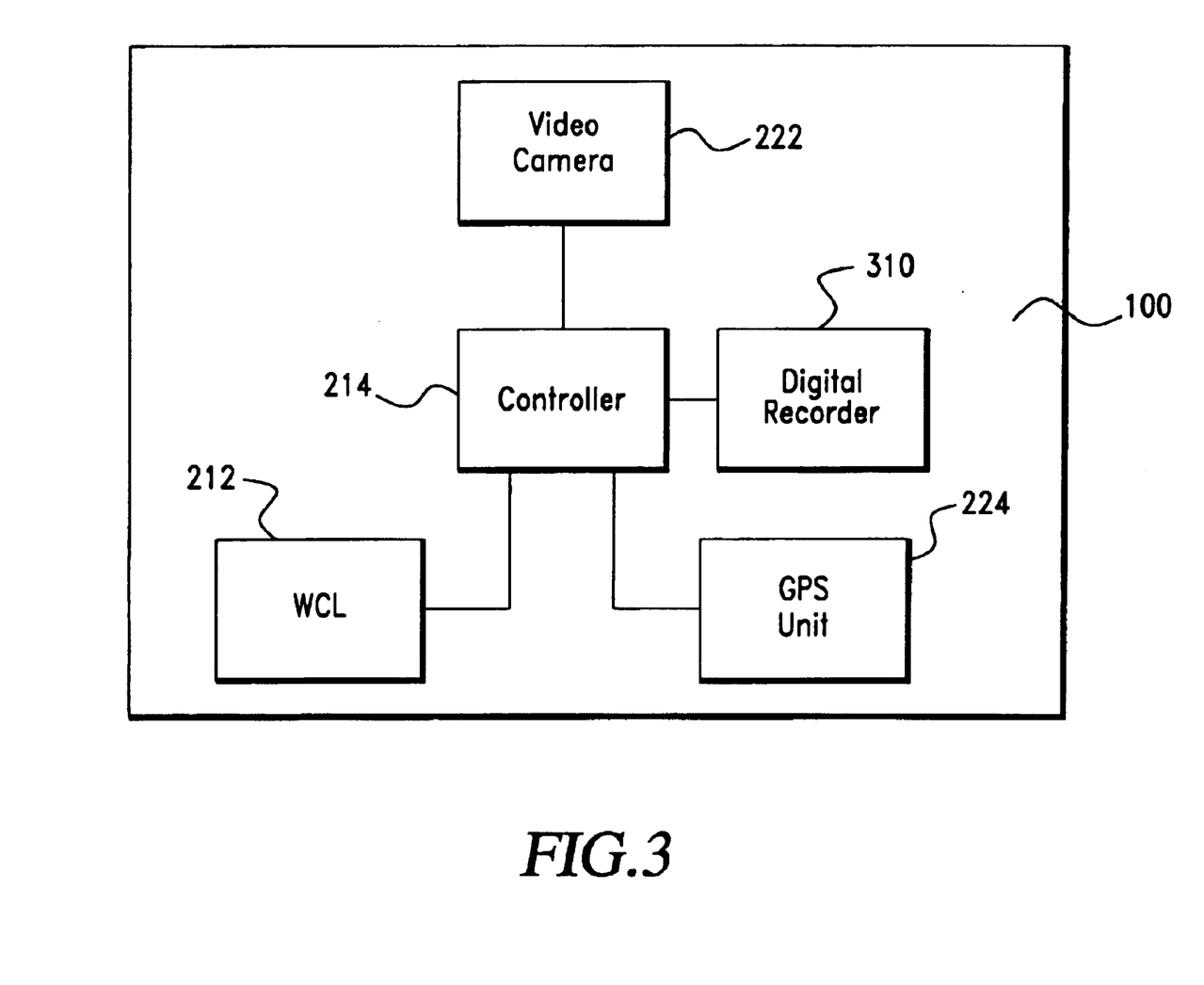
FIG. 3 is a block diagram of a device platform according to another embodiment of the invention.

FIG. 3 shows another embodiment of the invention. Here, device platform 100 is provided with a digital recorder 310. The pet owner may record a message containing, for example, name and contact information, for retrieval by a passerby who locates the animal. As illustrated in FIG. 3, digital recorder 310 is coupled to controller 214. Accordingly, the pet owner may record and listen to messages on digital recorder 310 from remote sites. The pet owner may transmit a command signal from remote source 104 to wireless communication link 212, which passes the signal to controller 214. Controller 214 discriminates the command signal and transmits a record or playback signal to digital recorder 310 as appropriate.

Figure 4:
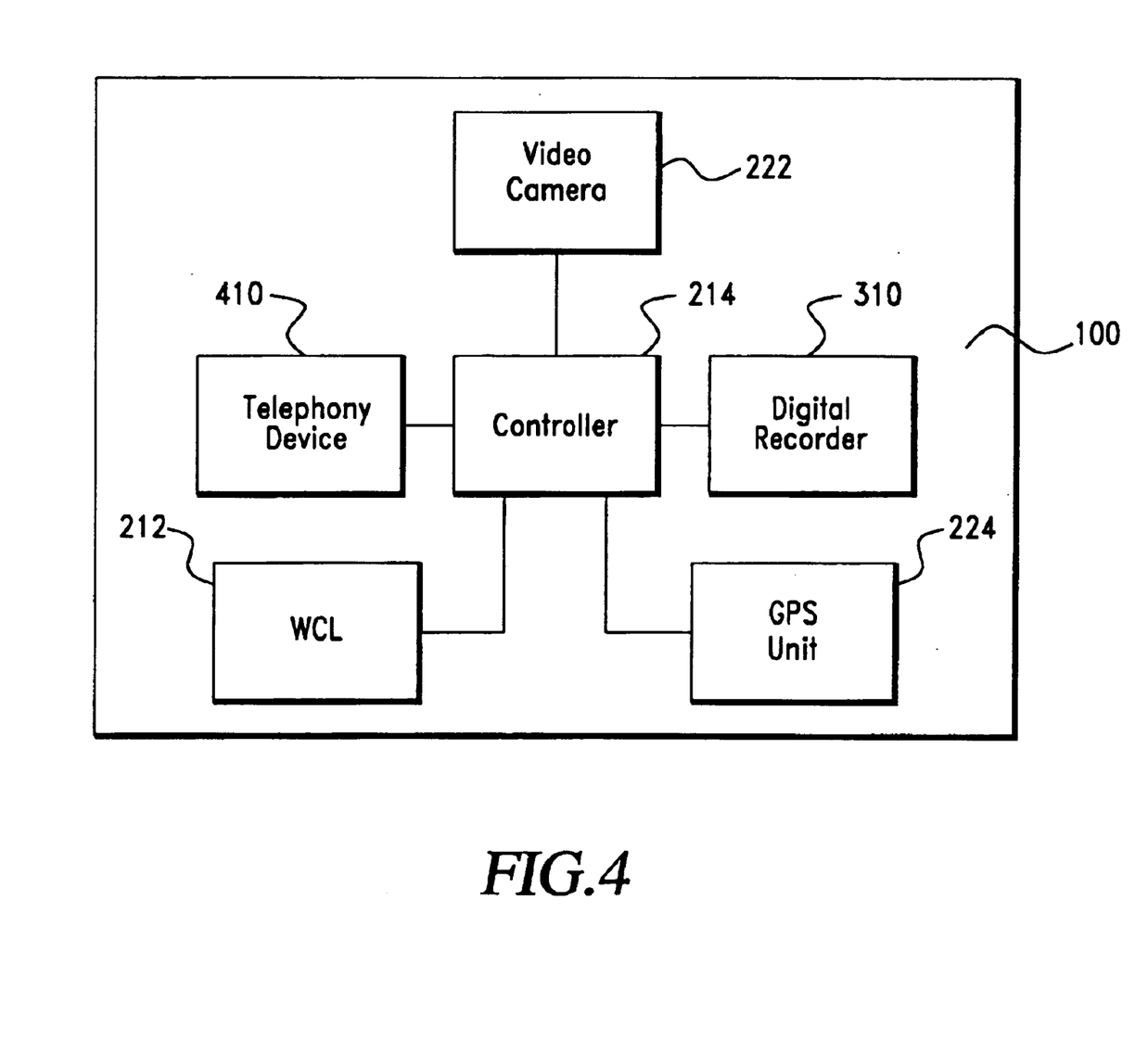
FIG. 4 is a block diagram of a device platform according to still another embodiment of the invention.

FIG. 4 illustrates still another embodiment of the invention. Here device platform 100 is provided with a telephony device 410 that includes telephony circuitry and a two-way speaker. Telephony device 410 is preferably programmed to dial a preselected number upon activation, e.g. the pet owner's home number or the number of the central facility. This will provide an alert to the pet owner when the pet becomes lost. Telephony device 410 also may be operative to receive calls. This feature is particularly useful where animal collar 106 is worn by house pets. A homeowner may give a voice command to the pet (typically a dog) to patrol the house. The homeowner may then survey the patrolled area using remote receiver 104.

Figure 5:
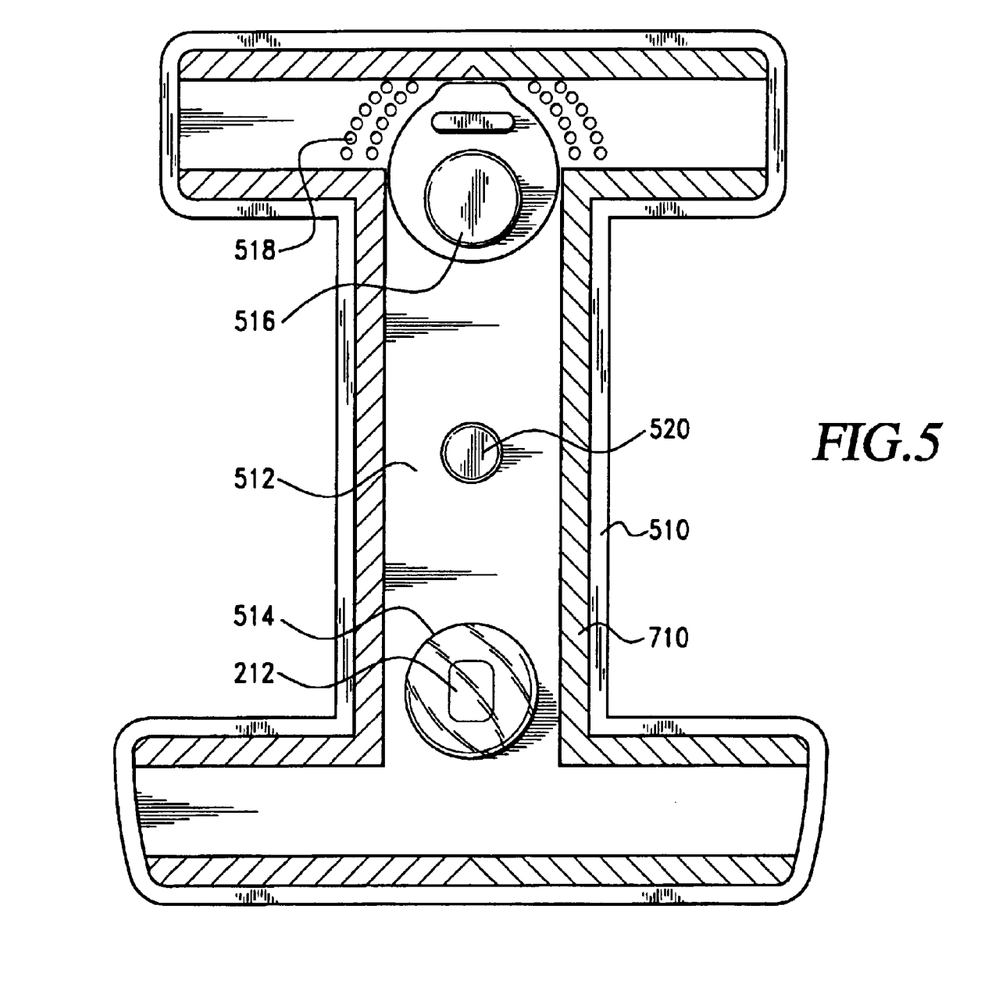
FIG. 5 is a top view of an animal collar in accordance with the present invention.
Figure 6:
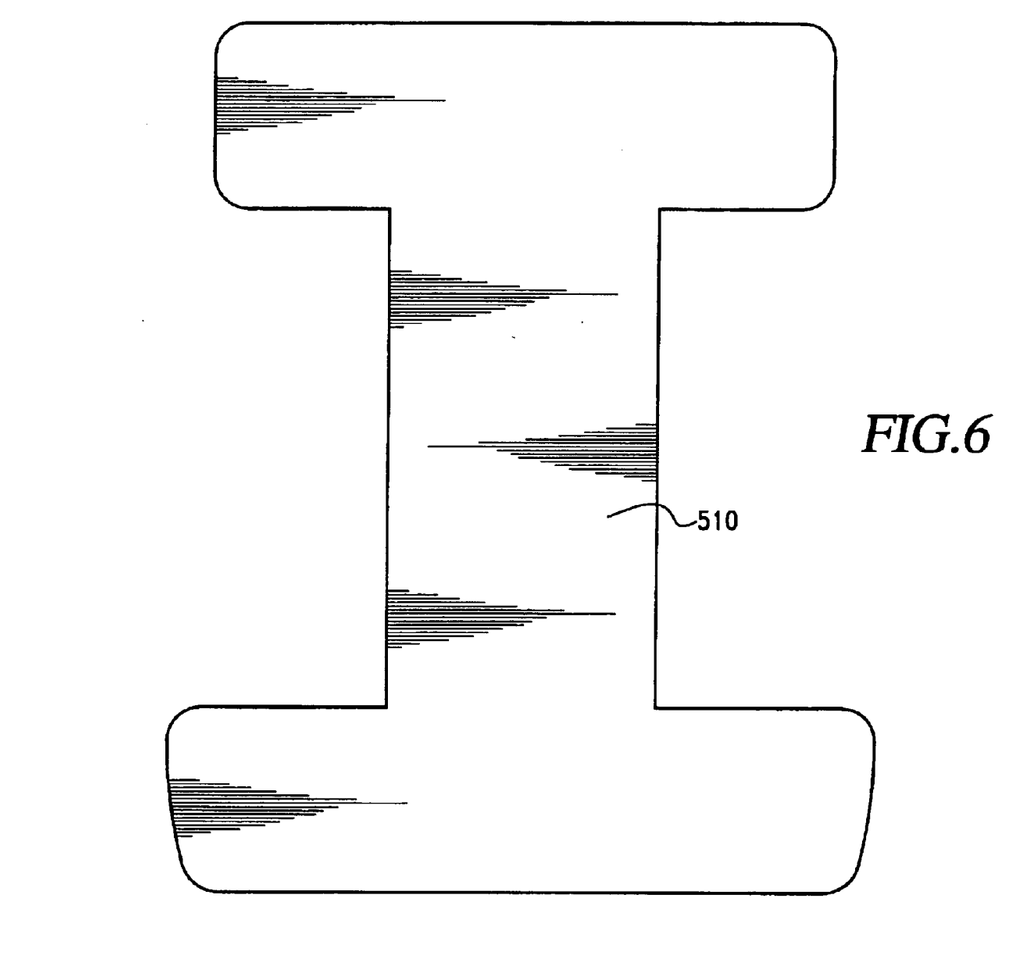
FIG. 6 is a top view of a base layer of the animal collar of FIG. 5.
Figure 7:
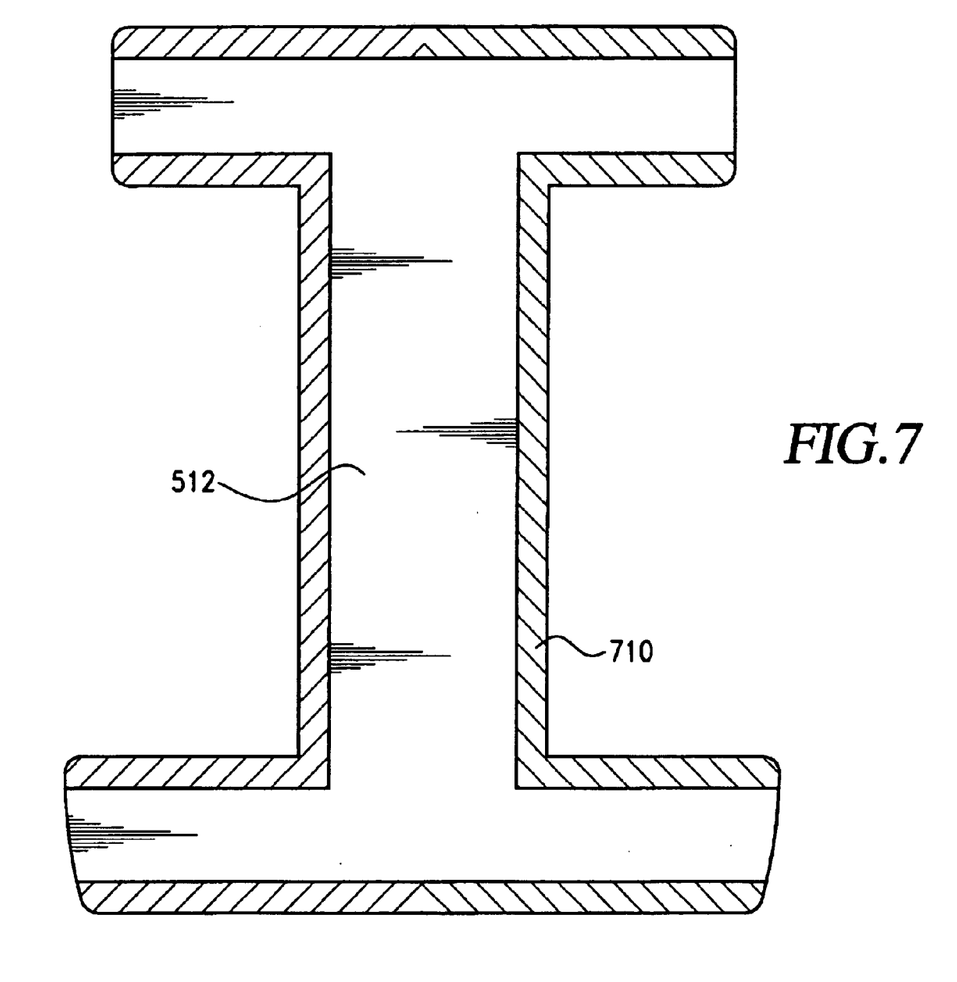
FIG. 7 is a top view of a cover layer of the animal collar of FIG. 5.

FIGS. 5–8 illustrate an exemplary construction for animal collar 106. The term collar, as used herein, is not intended to be limited to the structures depicted in FIGS. 5–8 but, rather, is intended to encompass a wide variety of devices including collars, harnesses, muzzles, saddles and the like. FIG. 5 depicts a top view of an embodiment of animal collar 106 in accordance with the invention. Animal collar 106 includes a layered structure including a base layer 510 comprised of a durable, weather resistant material, e.g., leather, and a cover layer 512 comprised of a plastic or plastic like material. The material cover layer 512 is preferably weather resistant and fire retardant. Base layer 510 and cover layer 512 are best illustrated in FIGS. 6 and 7. In keeping with a preferred aspect of the invention, cover layer 512 may include a light emitting or phosphorescent substance that increases visibility of animal collar 106 in a dark environment. In the case of a domesticated animal, cover layer 512 may be provided with a layer of reflective material along the perimeter, such as conventional reflective tape, to improve daylight visibility Base layer 510 is illustrated in FIG. 6. Base layer 510 may be punched or cut from a material sheet and may be shaped according to its intended use. For example, as illustrated, base layer 510 shaped for construction as a harness primarily intended for a four-legged animal.

Cover layer 512 is illustrated in FIG. 7. Like base layer 510, cover layer 512 may be punched or cut from sheet material and may be shaped according to its intended use. Reflective material 710 is disposed along the perimeter of cover layer 512 to provide increased visibility at dawn and dusk.

Figure 8:
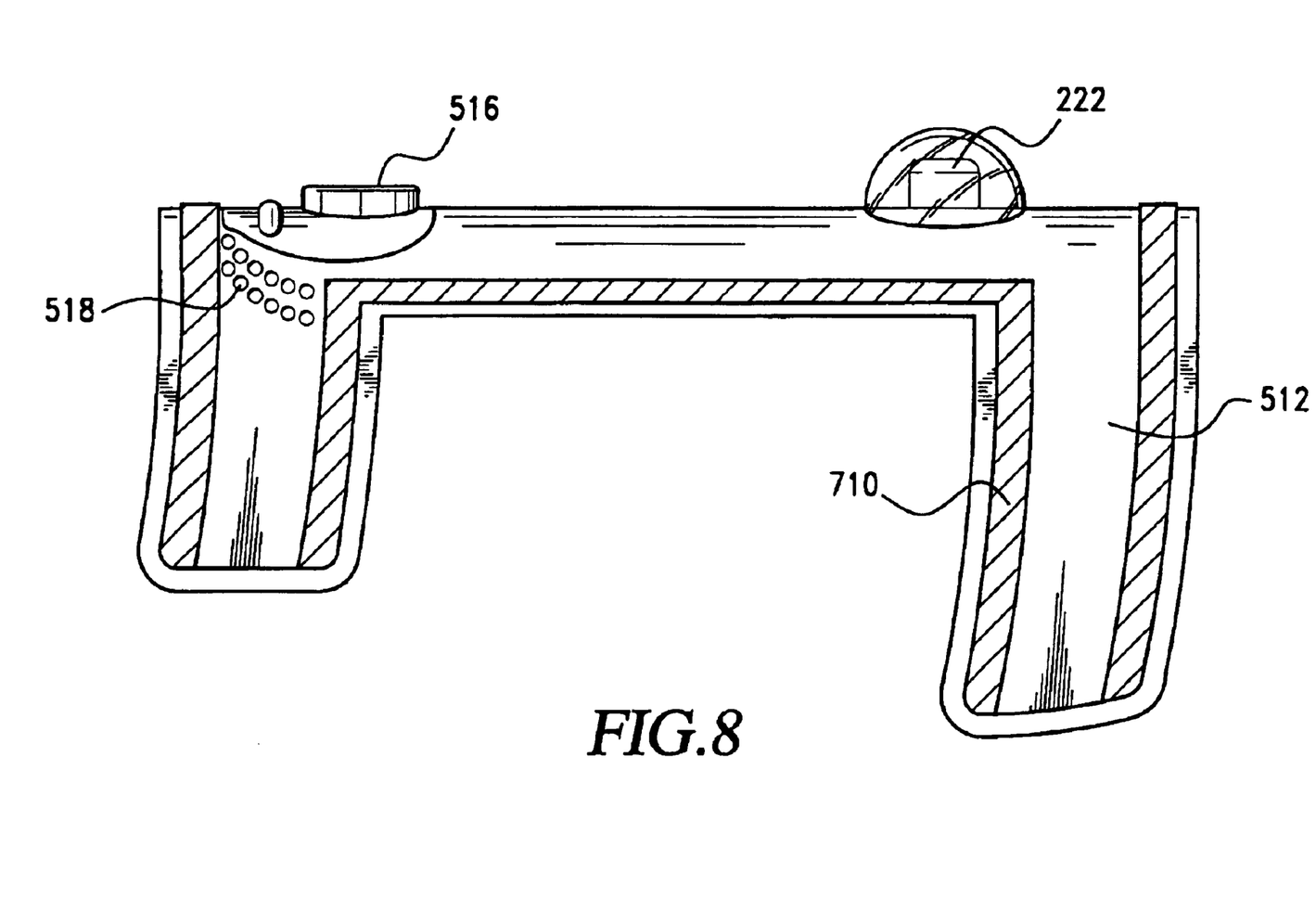
FIG. 8 is a side view of the animal collar of FIG. 5.

Returning to FIG. 5, device platform 100 is preferably sandwiched between cover layer 512 and base layer 510. However, digital camera 222 preferably protrudes through and above cover layer 512 by at least about 1.5 cm as best illustrated in FIG. 8. To protect digital camera 222 from damage, digital camera 222 is enclosed in a housing 514 which may be a rigid plastic material.

Animal collar 106 may be further provided with a switch for telephony device 410 in the form of button 516 that protrudes through and above cover layer 512. When a user depresses button 516, telephony device 416 places a call to a predetermined number. The user may converse with the call recipient via two-way speakers 518. Animal collar 106 may be provided with a second switch in the form of button 520 for causing digital recorder 310 to play the prerecorded message.

Industrial Applicability

The present invention is well suited to a variety of applications. In one such application the present invention may be used for locating and tracking pets. For example, the pet may be equipped with an animal collar in accordance with the invention allowing the pet owner to quickly obtain the pet's whereabouts and to search the pet's immediate surroundings for landmarks or signs of danger.

This invention may be further used for locating and tracking wild animals and viewing the environment or habitat of those animals unencumbered by human presence. For example, a jungle animal may be equipped with an animal collar in accordance with the invention to allow a zoologist to better study the animal's behavior and habitat.

Oceanographers may also study the behavior and habitat of sea creatures using the present invention. For example, an oceanographer may attach a collar in accordance with the invention to a sea creature and view and/or broadcast the images transmitted from the collar, preferably in real time.

This invention is also particularly useful for security personnel who employ guard dogs, for example. The animal collar of this invention may be worn by a guard dog that can patrol a building or area. The collar transmits video signals to the security personnel wherever they may be located which substantially increases the effective area that may be patrolled.

This invention is also useful for law enforcement personnel and rescue personnel. The collar according to the invention may be worn by, for example, narcotic sniffing canines or rescue animals who may be sent into areas that are either physically inaccessible or pose a significant threat to humans. Accordingly, the collar allows law enforcement personnel and rescue personnel to search areas that they otherwise would not search.

In addition, the invention may be employed with hunting dogs assist the hunter in locating his prey. Also, the invention may be used by space exploration personnel to transmit images from outer space to earth. Numerous other uses will be apparent to the skilled artisan in view of the foregoing disclosure.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We claim:

1. An apparatus for locating or tracking animals comprising:
   an animal collar including:
      a digital video camera that generates video signals,
      a digital recorder including a pro-recorded message;
      a global positioning unit operative for receiving a global positioning signal,
      a controller in communication with the digital video camera and the global positioning unit, the controller including a wireless communications link;
   a remote source in communication with the wireless communication link, the controller being operative to transmit the video signals to said remote source and the controller being operative to cause said digital recorder to play said prerecorded message responsive to a command signal from said remote source.

2. The apparatus for locating or tracking animals of claim 1 wherein the digital camera is movably mounted to said animal collar and the controller transmits a motion control signal to the digital video camera.

3. The apparatus for locating or tracking animals of claim 2 wherein the digital camera moves according to a rotation pattern responsive to the motion control signal.

4. The apparatus for locating or tracking animals of claim 3 wherein the digital camera rotates through a pan angle of up to 360° and a tilt angle of up to 180° responsive to the motion control signal.

5. The apparatus for locating or tracking animals of claim 4 wherein the digital camera rotates for up to 30 seconds through a pan angle of 360°.

6. The apparatus for locating or tracking animals of claim 3 wherein the controller includes memory that stores the rotation pattern of the digital camera.

7. The apparatus for locating or tracking animals of claim 1 wherein the controller determines the coordinates where the animal collar is located and transmits the coordinates to the remote source responsive to the global positioning signal.

8. The apparatus of for locating or tracking animals of claim 1 further comprising a telephony device disposed on the animal collar operative to place a call to a programmed phone number.

9. The apparatus for locating or tracking animals of claim 1 wherein the remote source comprises one of a remote computing device and a remote receiver.

10. The apparatus for locating or tracking animals of claim 9 wherein the controller transmits real time full motion video signals to one of the remote computing device and the remote receiving device.

11. The apparatus for locating and tracking animals of claim 9 wherein the controller transmits time lapse video signals to one of the remote computing device and the remote receiver.

12. The apparatus for locating and tracking animals of claim 9 wherein the controller transmits the global positioning signal to the remote source.

13. The apparatus for locating and tracking animals of claim 9 wherein the controller converts the global positioning signal to location coordinates and transmits the location coordinates to one of the remote computing device and the remote receiver.

14. The apparatus for locating or tracking animals of claim 1 wherein the global positioning unit and the digital camera default to a sleep state.

15. An animal collar comprising:
    a digital video camera that generates video signals,
    a digital recorder including a prerecorded message;
    a global positioning unit operative for receiving a global positioning signal,
    a controller in communication with the digital video camera and the global positioning unit, the controller including a wireless communications link, the controller being operative to transmit the video signals and the global positioning signals to a remote source responsive to a command from the remote source and the controller being operative to cause said digital recorder to play said prerecorded message responsive to a command signal from a remote source.

16. The animal collar of claim 15 wherein the digital camera is movably mounted to said animal collar and the controller transmits a motion control signal to the digital video camera.

17. The animal collar of claim 15 wherein the digital camera moves according to a rotation pattern responsive to the motion control signal.

18. The animal collar of claim 17, wherein the digital camera rotates through a pan angle of up to 360° and a tilt angle of up to 180° responsive to the command signal.

19. The animal collar of claim 18 wherein the digital camera rotates for up to 30 seconds through a pan angle of 360°.

20. The animal collar of claim 17 wherein the controller includes memory that stores the rotation pattern of the digital camera.

21. The animal collar of claim 15 wherein the controller determines the coordinates where the animal collar is located and transmits the coordinates to a remote source responsive to the global positioning signal.

22. The animal collar of claim 15 further comprising a telephony device disposed on the animal collar operative to place a call to a programmed phone number.

* * * * *